United States Patent [19]

Farmer et al.

[11] Patent Number: 5,311,413

[45] Date of Patent: May 10, 1994

[54] DEVICE FOR INSTANTANEOUSLY ENERGIZING GLOW BAIT USED FOR FISHING

[76] Inventors: Franklin D. Farmer, 408 S. Francis, Lansing, Mich. 48912; Gordon J. Alspaugh, 416 S. Division St., Carson City, Mich. 48811; Victor O. Castle, Jr., 105 Mill St., Box 121, Maple Rapids, Mich. 48853

[21] Appl. No.: 111,940

[22] Filed: Aug. 26, 1993

[51] Int. Cl.⁵ ............................................. F21V 33/00
[52] U.S. Cl. ..................................... 362/154; 362/84; 362/157; 43/17.6
[58] Field of Search ................. 362/154, 84, 157, 101, 362/295, 253; 43/17.5, 17.6

[56] References Cited

U.S. PATENT DOCUMENTS

| | | |
|---|---|---|
| 564,839 | 7/1896 | Pflueger . |
| 1,275,890 | 8/1918 | Flannery . |
| 1,654,370 | 12/1927 | Goetschius . |
| 1,817,694 | 8/1931 | Lafky . |
| 2,303,097 | 11/1942 | Townsend et al. . |
| 2,905,863 | 9/1959 | Martin et al. . |
| 4,161,388 | 7/1979 | Bouchard et al. . |
| 4,209,823 | 6/1980 | Burkdoll . |
| 4,242,831 | 1/1981 | O'Shaughnessy . |
| 4,528,621 | 7/1985 | Hoyt . |
| 4,577,262 | 3/1986 | Buteaux ............... 362/154 |
| 4,621,308 | 11/1986 | Holmberg et al. ......... 362/154 |
| 4,855,881 | 8/1989 | Pence ................... 362/154 |
| 5,178,450 | 1/1993 | Zelensky et al. ......... 362/154 |

Primary Examiner—Richard R. Cole
Attorney, Agent, or Firm—Ian C. McLeod

[57] ABSTRACT

A device (10) for instantaneously energizing glow bait (22), is described. The device has a container (12) with a reflective chamber (16) mounted inside. The reflective chamber has a reflective layer (18) surrounded by a transparent layer which allows light from a flash circuit (32) to reflect off the reflective layer and onto the glow bait to be energized. The flash circuit is mounted within a lid (26) pivotably mounted to the top (14A) of the handle (14) adjacent the top portion (12H) of the container. In the closed position, the lid completely covers the top opening (12D) of the container and upon activation, the flashbulb (38) of the flash circuit directs a flash of light down into the reflective chamber containing the glow bait. The flash circuit is activated by a switch (44) located on the top of the handle of the container. In an alternate embodiment, the reflective layer (116) is mounted directly to the interior surface (112F) of the container (112) of the device (110).

27 Claims, 3 Drawing Sheets

DEVICE FOR INSTANTANEOUSLY ENERGIZING GLOW BAIT USED FOR FISHING

BACKGROUND OF THE INVENTION (1) Field of the Invention

The present invention relates to a device for instantaneously energizing glow bait for use in fishing. In particular, the present invention relates to a container having a reflective inner chamber and a flash circuit located within a lid for the container. The glow bait is placed in the container and the lid is closed, which completely encloses the reflective chamber in the container. The flash circuit is activated and the glow bait is instantaneously energized within the container.

(2) Prior Art

The general use of a light source to energize luminous material to prolong illumination is well known in the prior art. Illustrative of such devices are U.S. Pat. Nos. 1,275,890 to Flannery; 1,654,370 to Goetschius; 2,905,863 to Martin et al; 4,209,823 to Burkdoll and 4,528,621 to Hoyt. With the above devices, the luminous material is part of the device. In addition, the luminous material is exposed to the light source for a considerable length of time.

U.S. Pat. No. 4,161,388 to Bouchard et al uses a flashlamp to activate a phosphorous coating which is disposed on the interior surface of the housing surrounding the flashlamp. Although, only a single flash is used to activate the phosphorous coating, the luminous material is again attached to the light source.

U.S. Pat. No. 4,242,831 to O'Shaughnessy uses an activation apparatus which includes a hollow housing made of a transparent plastic material within which is located a battery operated lamp surrounded by a transparent plastic cylinder to activate a phosphorescent member. The phosphorescent member is placed on top of the transparent housing immediately above the lamp, which is then illuminated. Here, the phosphorescent member is separate from the light source but this activation apparatus does not instantly energize the phosphorescent member using a flash of light.

Thus, none of the prior art shows a device which uses a flash of light to instantaneously energize luminous material which can then be removed from the device for use elsewhere. In particular, none of the prior art describe a device which is used to instantaneously energize glow bait for fishing which is portable and easy to use.

Also of interest are U.S. Pat. Nos. 564,839 to Pflueger; 1,817,694 to Lafky and 2,303,097 to Townsend et al which show various fishing lures using luminous material.

OBJECTS

It is therefore an object of the present invention to provide a device having a reflective chamber in a container and a lid which fits over the top opening of the container and contains a flash circuit to provide a flash of light in the interior of the container. Further, it is an object of the present invention to provide a device which will instantaneously energize glow bait for fishing such that the glow bait remains energized up to one hour. Still further, it is an object of the present invention to provide a device which will instantaneously energize one or more glow baits at one time on all sides. Further, it is an object of the present invention to provide a device which can be held in one hand and activated with the same hand. Still further, it is an object of the present invention to provide a device which will withstand exposure to the elements and will also float. Finally, it is an object of the present invention to provide a device which is portable and relatively inexpensive to manufacture.

DETAILED DESCRIPTION OF THE PREFERRED EMBODIMENTS

Figure 1:
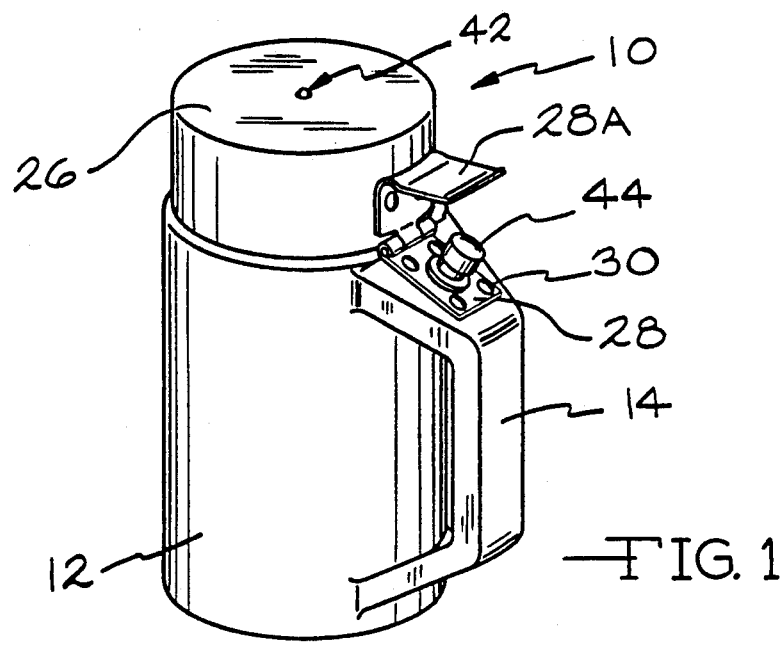
FIG. 1 is a perspective view of the device 10 showing a lid 26 in the closed position on a container 12.

The present invention relates to a device for instantaneously energizing a glow bait for use in fishing which comprises: a container means having a bottom wall and a sidewall extending upward from the bottom wall to form a top opening; the container means having an interior surface and an exterior surface; a reflective means mounted inside the container means; a lid means for completely covering the top opening of the container means; and a flash means mounted inside the device to instantaneously energize the glow bait within the container means upon production of a flash of light by the flash means.

Furthermore, the present invention relates to a device for instantaneously energizing a glow bait for use in fishing which comprises: a container means having a bottom wall and a sidewall extending upward from the bottom wall to form a top opening; the container means having an interior surface and an exterior surface; a reflective means mounted inside the container means; a lid means pivotably mounted adjacent to the top opening of the container means for completely covering the top opening to close the container means; and a flash means mounted on the lid means and orientated so as to flash from the top opening of the container means into the container means when the lid means is covering the top opening to instantaneously energize the glow bait within the container means upon production of a flash of light by the flash means.

In particular, the present invention relates to a device for instantaneously energizing a glow bait for use in fishing which comprises: a container means having a bottom wall and a sidewall extending upwards from the bottom wall to form a top opening, the container means having an interior surface and an exterior surface; a reflective layer means mounted inside the container means; a transparent layer means mounted adjacent to the reflective layer means on a side opposite the container means; a lid means pivotably mounted adjacent the top opening of the container means having a top wall and a sidewall extending downward from the top wall, the top wall having an inner surface; a flash means mounted on the inner surface of the top wall of the lid means and orientated so as to flash from the top opening of the container means into the container means when the lid means is covering the top opening upon production of a flash of light by the flash means; and an activating means mounted outside of the device for activating the flash means when the lid means is covering the top opening of the container means.

The present invention also relates to a method for instantaneously energizing a glow bait which comprises: providing a container means having a bottom wall and a sidewall extending upward from the bottom wall to form a top opening; the container means having an interior surface and an exterior surface; a reflective means mounted inside the container means; a lid means for completely covering the top opening of the container means; a flash means mounted inside the device to instantaneously energize the glow bait within the container means upon production of a flash of light by the flash means; placing glow bait in the device; closing the lid of the device to completely enclose the glow bait; activating the electronic flash means to energize the glow bait and; removing the bait from the container means.

Finally, the present invention relates to a method for instantaneously energizing a glow bait for use in fishing which comprises: providing a container means having a bottom wall and a sidewall extending upwards from the bottom wall to form a top opening, the container means having an interior surface and an exterior surface; a reflective layer means mounted inside the container means; a transparent layer means mounted adjacent the reflective layer means on a side opposite the container means; a lid means pivotably mounted adjacent the top opening of the container means having a top wall and a sidewall extending downward from the top wall, the top wall having an inner surface; a flash means mounted on the inner surface of the top wall of the lid means and orientated so as to flash from the top opening of the container means into the container means when the lid means is covering the top opening upon production of a flash of light by the flash means; and an activating means mounted outside of the device for activating the flash means when the lid means is covering the top opening of the container means; placing glow bait in the container means; closing the lid means over the top opening of the container means to completely close the container means; activating the flash means for energizing the glow bait; and removing the bait from the container means.

The preferred embodiment of the invention has a reflective means and a transparent means adjacent the interior surface of the container. The reflective means and the transparent means preferably have a concave shape adjacent the bottom wall of the container in order to enable all side of the glow bait to be energized in a single activation of the flash means. Also in the preferred embodiment, the container means has a handle means on the exterior surface of the container means. The activating means and the tab and hinge for flipping open the lid are both preferably mounted onto the handle to allow single handed operation of the device.

Figure 2:
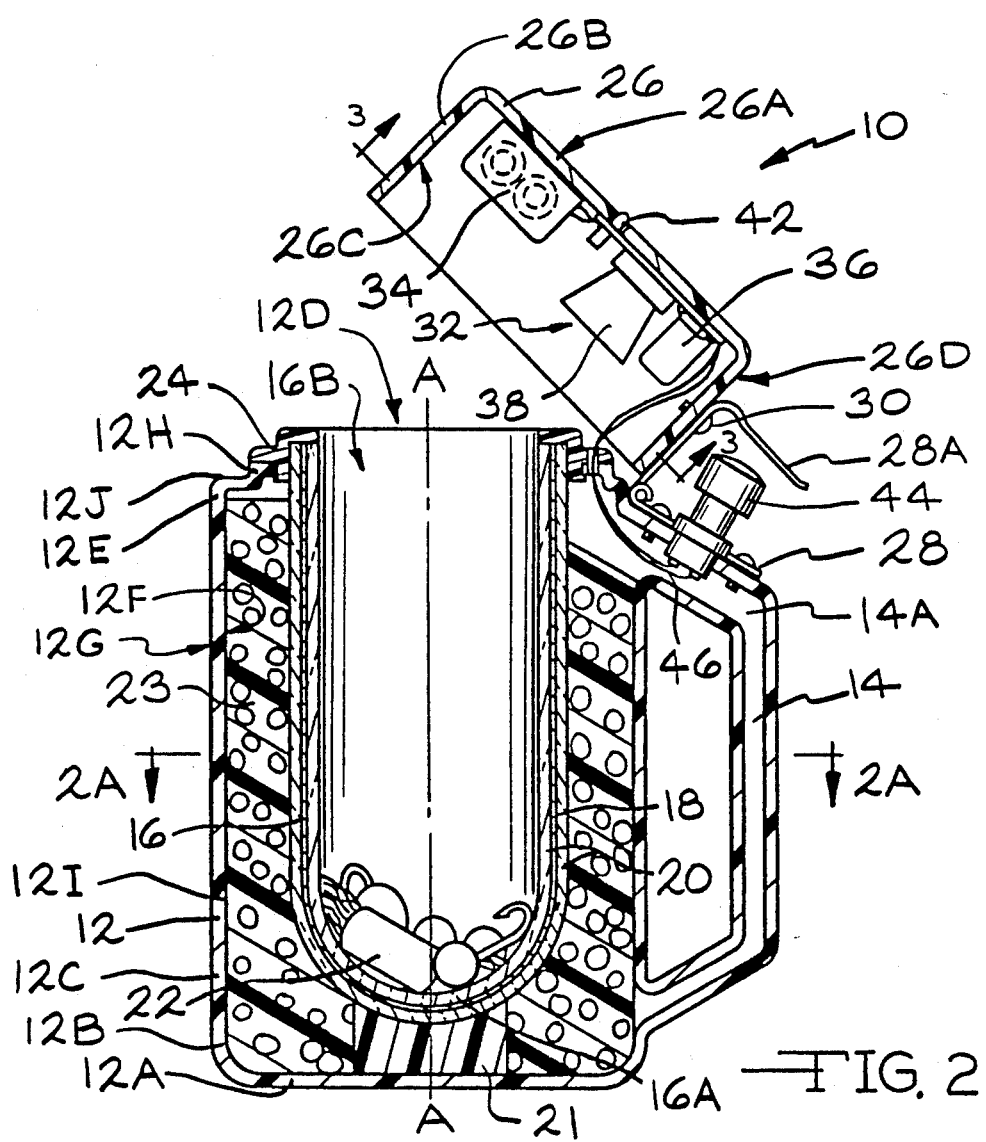
FIG. 2 is a front cross-sectional view of the device 10 showing a circular cross-sectional reflective layer 18 and a transparent layer 20 of the reflective chamber 16 and the glow bait 22 and a flash circuit 32 mounted within the lid 26.
Figure 2A:
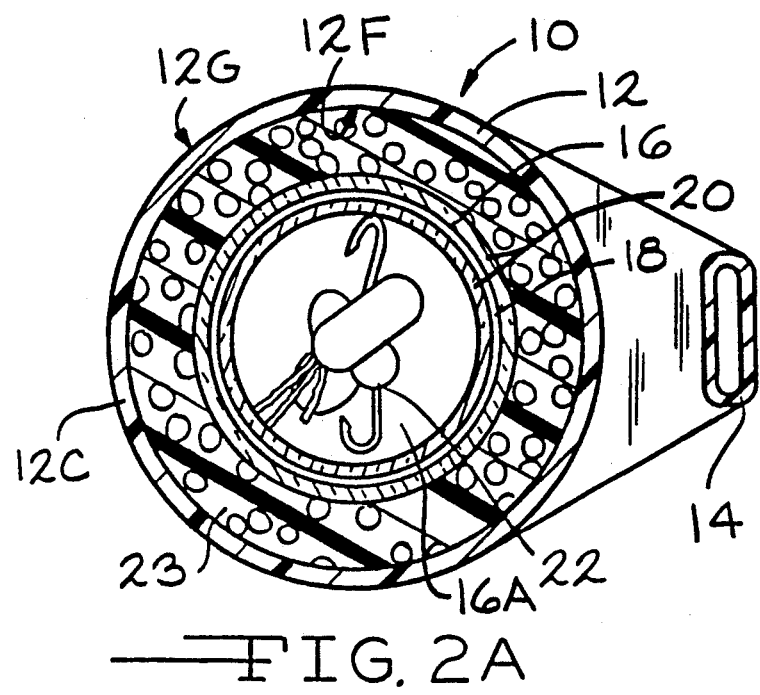
FIG. 2A is a top cross-sectional view of the device 10 along the line 2A—2A of FIG. 2 showing the container 12, the reflective layer 18 and the transparent layer 20 of the reflective chamber 16.

FIGS. 1 and 2 show the glow bait energizing device 10 of the present invention. The preferred embodiment of the device 10 includes a container 12 having a reflective chamber 16, a lid 26 and a flash circuit 32 mounted within the lid 26. The container 12 has a bottom wall 12A which forms the bottom 12B of the container 12 and a sidewall 12C which extends upward from the bottom wall 12A to form a top opening 12D at the top 12E of the container 12. As shown in FIG. 2A, the container 12 has a circular cross-section and is provided with an interior surface 12F and an exterior surface 12G extending from bottom 12B of the container 12 to the top 12E of the container 12. The exterior surface 12G of the container 12 has a top portion 12H located adjacent the top opening 12D of the container 12 and a bottom portion 12I located adjacent the bottom wall 12A of the container 12. The top portion 12H of the container 12, preferably has an outer diameter smaller than the outer diameter of the bottom portion 12I of the container 12 such that a shoulder 12J is formed at the intersection of the top portion 12H and the bottom portion 12I of the container 12. As shown in FIG. 2, the exterior surface 12G of the container 12 is provided with a handle 14 which extends along the exterior surface 12G of the container 12, parallel to the longitudinal axis A—A of the container 12. The handle 14 extends upward from the bottom wall 12A of the container 12 with the top 14A of the handle 14 mounted just below the top portion 12H of the container 12. The handle 14 is spaced apart from the exterior surface 12G of the container 12 which allows for easy grasping and handling of the container 12. Preferably, the handle 14 is of a size and is spaced apart from the exterior surface 12G of the container 12 that an average adult can completely insert all the fingers of one hand (not shown) through the handle 14. In the preferred embodiment, the container 12 is constructed from lightweight plastic and the handle 14 and the container 12 are blow molded as a unitary piece such that the handle 14 is hollow which acts to increase the buoyancy of the device 10. The exterior surface 12G of the container 12 is waterproof to protect the interior surface 12F of the container 12. The container 12 is also able to float such that the device 10 is able to be retrieved from the water in case of accidental dropping of the device 10 into the water.

The reflective chamber 16, which can be removeable, has a closed bottom 16A and an open top 16B and is preferably mounted parallel to the interior surface 12F of the container 12. The chamber 16 has a reflective layer 18 encased in a transparent layer 20 (FIG. 2A). In the preferred embodiment, the reflective chamber 16 has a circular cross-section with the inner diameter of the chamber 16 of such a size that an average adult can completely insert a hand into the chamber 16 to allow for easy removal and insertion of the glow bait 22 into the container 12. The chamber 16 preferably has a constant inner diameter along its length to prevent injury to the user or the damage to device 10 during insertion and removal of the glow bait 22. The removeability of the chamber 16 allows for easy replacement of the chamber 16 when necessary due to damage to the chamber 16. The constant diameter and the closed bottom 16A allow for even reflection of the light from the flash circuit 32 (to be described in detail hereinafter) which allows uniform contact of the light with the glow bait 22 which achieves even energization of the glow bait 22. The reflective layer 18 is encased in a transparent layer 20 such that the reflective layer 18 is surrounded on all sides by the transparent layer 20. Preferably, the transparent layer 20 with the inner reflective layer 18 within, is constructed in two longitudinal halves which are fused together to form the chamber 16 (FIG. 2A). The transparent layer 20 is preferably constructed of glass and has a thickness on at least the side of the reflective layer 18 opposite the interior surface 12E of the container 12 such that when the glow bait 22 is placed on the transparent layer 20, the glow bait 22 is spaced above the reflective layer 18. The spacing of the glow bait 22 above the reflective layer 18 enables the light from the flash circuit 32 to reflect off the reflective layer 18 at varying angles and to reflect off the reflective layer 18 located beneath the glow bait 22 to energize the portion of glow bait 22 adjacent to the transparent layer 20. In the preferred embodiment, the closed bottom 16A of the chamber 16 is spaced above the bottom wall 12A of the container 12 and is curved such that the closed bottom 16A forms a concave surface adjacent the bottom wall 12A of the container 12 (FIG. 2). The concave transparent layer 20 and reflective layer 18 allow the flash of light from the flash circuit 32 to reflect off the concave reflective layer 18 onto all sides of the glow bait 22 such as to energize all sides of the glow bait 22. Thus, the glow bait 22 is able to be completely energized on all sides with a single activation. The closed bottom 16A of the chamber 16 is provided with a spacer 21 located between the closed bottom 16A of the chamber 16 and the bottom wall 12A of the container 12. The spacer 21 prevents the closed bottom 16A of the chamber 16 from making contact with the bottom wall 12A of the container 12. Preferably, the spacer 21 is constructed of an elastomeric material in order to act as a shock absorber during movement of the device 10. The container 12 is also provided with packing 23 adjacent the bottom wall 12A and bottom portion 12I of the container 12 such as to prevent the chamber 16 from coming in contact with the interior surface 12E of the container 12.

In the preferred embodiment, a circular rim 24, which can be removeable for removal of chamber 16, is mounted around the perimeter of the open top 16B of the chamber 16. The outer diameter of the circular rim 24 of the chamber 16 is preferably larger than the inner diameter of the top opening 12D of the container 12 such that the rim 24 rests upon the top opening 12D of the container 12 upon insertion of the reflective chamber 16 into the container 12. The length of the chamber 16 is slightly less than the length of the container 12 thus, when the chamber 16 is inserted into the container 12, the rim 24 comes in contact with the top opening 12D before the closed bottom 16A of the chamber 16 contacts the bottom wall 12A of the container 12. Preferably, the spacer 21 provided on the bottom 16A of the chamber 16 enables the bottom 16A of the chamber 16 to rest upon the bottom wall 12A of the container 12, when the rim 24 is resting upon the top opening 12D of the container 12. In the preferred embodiment, the diameter of the top portion 12H of the container 12 is the same as the outer diameter of the top rim 24 of the chamber 16. Thus, the rim 24 is flush with the top portion 12H of the container 12 such that the lid 26 (to be described in detail hereinafter) is able to easily close over the top portion 12H and the rim 24 to rest upon the shoulder 12J formed in the exterior surface 12G of the container 12 by the connection of the top portion 12H and the bottom portion 12I of the container 12. The lid 26 is comprised of a top wall 26A and a sidewall 26B extending outward from the top wall 26A and is provided with an inner surface 26C and an outer surface 26D. The lid 26 preferably has a circular cross-section with the inner diameter of the lid 26 approximately equal to the outer diameter of the top portion 12H of the container 12. The inner diameter of the lid 26 is such as to easily fit over the top portion 12H of the container 12 without excessive side-by-side motion such that in the closed position, the inner surface 26C of the lid 26 is adjacent the exterior surface 12G of the top portion 12H of the container 12. The thickness of the sidewall 26B is preferably less than the width of the shoulder 12J formed on the exterior surface 12G of the container 12. Thus the outer surface 26D of the lid 26 is spaced inward with respect to the exterior surface 12G of the bottom portion 12I of the container 12 when in the closed position. Having the outer surface 26D of the lid 26 indented from the exterior surface 12G of the container 12 increases the aesthetic quality of the device 10 and also helps prevent accidental opening of the lid 26 during activation. The length of the sidewall 26B of the lid 26 is preferably slightly greater than the length of the top portion 12H of the container 12 and the circular rim 24 of the chamber 16 combined such that when the lid 26 is in the closed position, the sidewall 26B of the lid 26 completely covers the top portion 12H of the container 12 and the circular rim 24 of the chamber 16 and the top wall 26A of the lid 26 is spaced above the rim 24 of the chamber 16.

Figure 3:
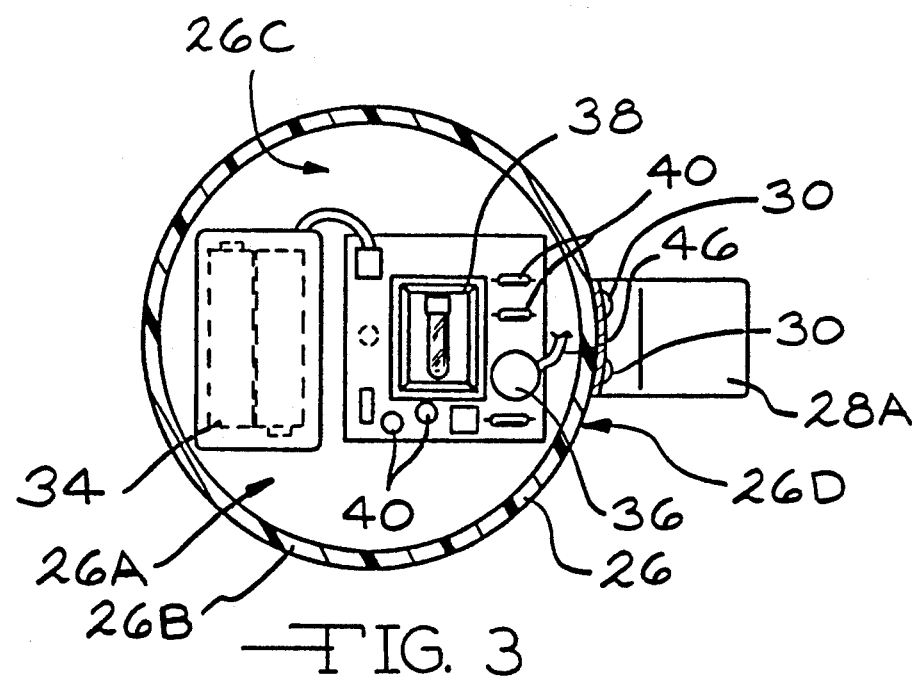
FIG. 3 is a cross-sectional view of the lid 26 along the line 3—3 of FIG. 2 showing a power source 34, a flashbulb 38 and a capacitor 36 of the flash circuit 32.

The lid 26 is mounted onto the top 14A of the handle 14 of the container 12 adjacent the top portion 12H of the container 12 (FIG. 2). The lid 26 is pivotably mounted to the container 12 by a hinge 28. The hinge 28 is mounted at one side to the exterior surface 12G of the container 12, preferably, to the top 14A of the handle 14 of the container 12 and at the other side to the outer surface 26D of the lid 26. Preferably, the hinge 28 is mounted by screws 30 having a length such as to extend through the sidewall 26B of the lid 26 but not such as to interfere with the secure closing of the lid 26 over the rim 24 and the top portion 12H of the container 12 (FIG. 3). As shown in FIG. 2, the hinge 28 is provided with a tab 28A which extends outward from the side of the hinge 28 mounted onto the outer surface 26D of the lid 26. The tab 28A allows for easier pivoting of the lid 26 to the open position and allows the lid 26 to be easily held in the open position. In the preferred embodiment, the tab 28A is located such that when the lid 26 is completely closed, the tab 28A is spaced above the top 16A of the handle 14 perpendicular to the axis A—A of the container 12 (FIG. 1). The positioning of the tab 28A is such that the user can grasp the handle 14 in one hand and use the same hand to flip open the lid 26. Preferably, the user grasps the handle 14 between the palm and fingers of the hand and uses the thumb of the same hand to push the tab 28A downward toward the handle 16 thus, causing the lid 26 to pivot open.

Figure 5:
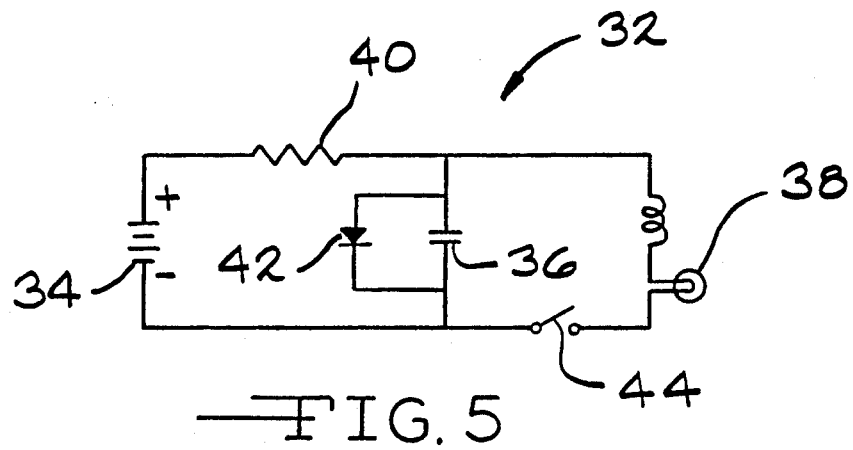
FIG. 5 is a schematic diagram of the flash circuit 32 including a switch 44.

The flash circuit 32 is mounted within the lid 26 adjacent the inner surface 26C of the top wall 26A of the lid 26 (FIGS. 2 and 3). The flash circuit 32 is mounted such that when the lid 26 is in the closed position, the circuit 32 is positioned within the top opening 12D of the container 12 such that the circuit 32 does not interfere with complete closure of the lid 26 over the container 12. Preferably, the circuit 32 is mounted on the inner surface 26C of the top wall 26A of the lid 26 by an adhesive (not shown) such as an epoxy resin. The circuit 32 is preferably similar to standard flash circuits well known in the art. The circuit 32 consists of a power source 34, a capacitor 36, a flashbulb 38 and other electrical components 40 electrically connected together as necessary for the circuit 32 to operate correctly (FIG. 5). The circuit 32 is arranged such that the flashbulb 38 flashes downward into the top opening 12D of the container 12 when the lid 26 is closed over the top opening 12D and the circuit 32 is activated (FIG. 2). Preferably, the flashbulb 38 is of an intensity such as to completely energize several glow bait 22 located within the container 12 during a single activation of the flashbulb 38. In the preferred embodiment, the power source 34 is comprised of two AAA alkaline batteries equaling 3 volts of power (FIG. 3). It is understood that other power sources could also be used, although, it is preferred that the source be portable, long lasting and easily replaced if necessary. The circuit 32 is also provided with an LED 42 which extends upward from the circuit 32 through the top wall 26A of the lid 26 (FIGS. 2 and 3). The LED 42 is connected to the capacitor 36 and illuminates when the capacitor 36 is sufficiently charged (FIG. 5). The LED 42 is located outside of the container 12 such as to signal the user when the flash circuit 32 has been activated to indicate that the glow bait 22 have been energized.

The flash circuit 32 is activated by a switch 44 mounted onto the exterior surface 12G of the container 12. In the preferred embodiment, the switch 44 is a push down spring resilient switch. The switch 44 is preferably mounted to the top 14A of the handle 14 adjacent the top portion 12H of the container 12 (FIG. 2). The switch 44 is mounted through the side of the hinge 28 mounted onto the top 14A of the handle 14 of the container 12. The switch 44 is located such that the user is able to grasp the handle 14 of the container 12 and activate the circuit 32 by means of the switch 44 with the same hand. Preferably, the tab 28A of the hinge 28 is spaced above the switch 44 and the height of the switch 44 is such that the switch 44 is not accidentally activated during opening of the lid 26. The switch 44 is preferably electrically connected to the circuit 32 by wires 46 which extend through the container 12 and into the lid 26 and are connected to the circuit 32 (FIG. 2).

Figure 4:
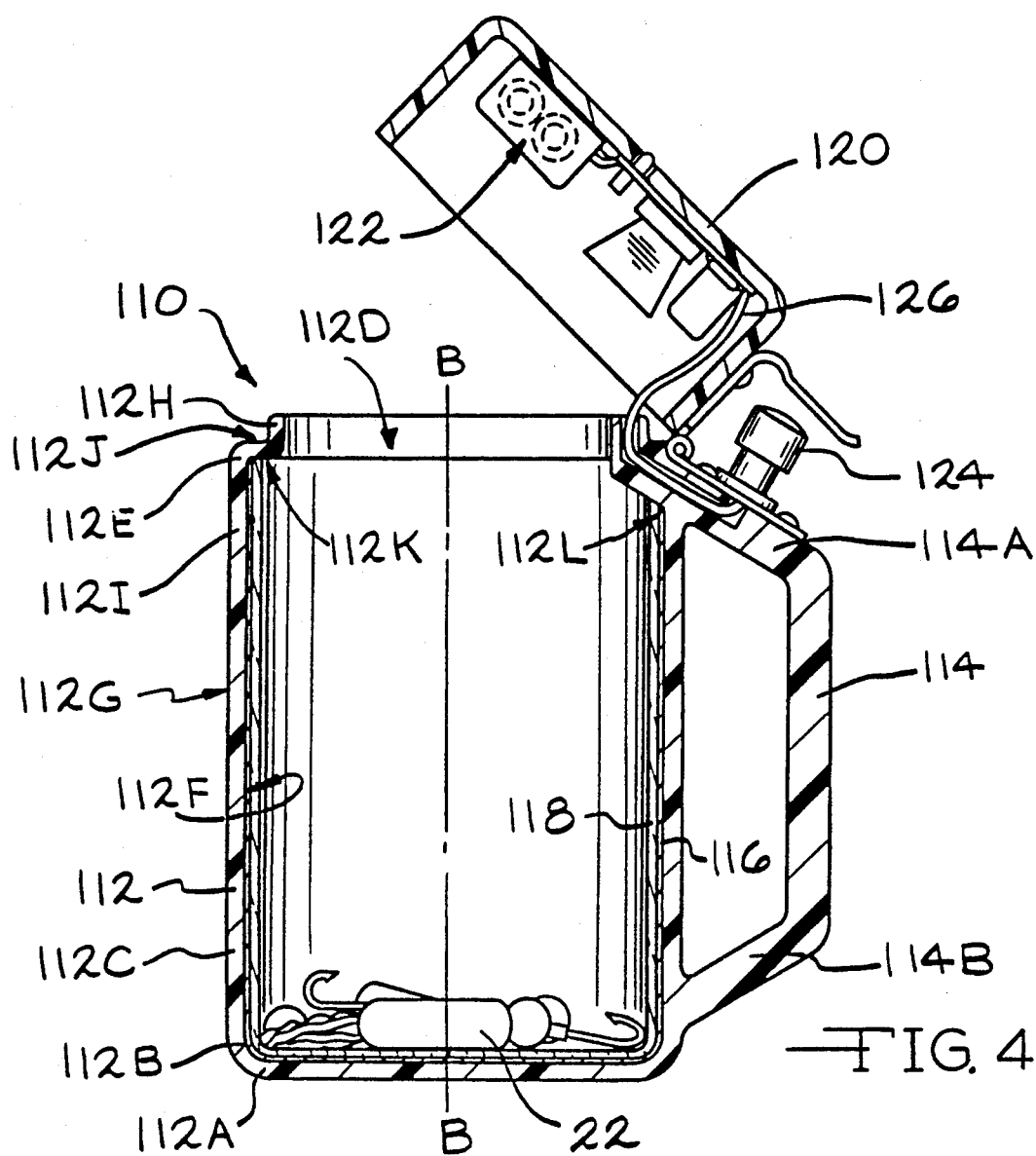
FIG. 4 is a cross-sectional view of a second embodiment of the device 110 showing a reflective layer 116, a transparent layer 118, glow bait 22 and a flash circuit 122 mounted within a lid 120.

In an alternate embodiment as shown in FIG. 4, the device 110 includes a container 112, a lid 120 and a flash circuit 122 mounted within the lid 120. The container 112 has a bottom wall 112A which forms the bottom 112B of the container 112 and a sidewall 112C which extends upward from the bottom wall 112A to form a top opening 112D at the top 112E of the container 112. The container 112 is provided with an interior surface 112F and an exterior surface 112G extending from top 112E of the container 112 to the bottom 112B of the container 112. The interior surface 112F is preferably spaced apart and parallel to the exterior surface 112G of the container 112. The exterior surface 112G of the container 112 has a top portion 112H located adjacent the top opening 112D of the container 112 and a bottom portion 112I located adjacent the bottom wall 112A of the container 112. The top portion 112H of the container 112, preferably has an outer diameter smaller than the outer diameter of the bottom portion 112I of the container 112 such that a first outer shoulder 112J and a first inner shoulder 112K are formed at the intersection of the top portion 112H and the bottom portion 112I of the container 112. The exterior surface 112G of the container 112 is provided with a handle 114 which extends along the exterior surface 112G of the container 112, parallel to the longitudinal axis B—B of the container 112. The handle 114 extends upward from the bottom wall 112A of the container 112 with the top 114A of the handle 114 mounted adjacent the top portion 112H of the container 112 and the bottom 114B of the handle 114 mounted adjacent the bottom wall 112A of the container 112. The top 114A of the handle 114 is angled downward and outward away from the top opening 112D of the container 112. The top 114A of the handle 114 forms the portion of the container 112 adjacent the top portion 112H of the container 112. A second inner shoulder 112L is formed at the point where the top 114A of the handle 114 joins with the exterior surface 112G of the container 112. The interior surface 112F of the container 112 adjacent the top 114A of the handle 114 is also angled inward toward the top opening 112H of the container 112 such as to remain parallel to the top 114A of the handle 114 and thus the exterior surface 112G of the container 112. The bottom 114B of the handle 114 is angled upward and outward away from the bottom wall 112A of the container 112 such that the handle 114 is spaced apart from the exterior surface 112G of the container 112. The handle 114 is spaced apart from the exterior surface 112G of the container 112 to allow for easy grasping and handling of the container 112. Preferably, the handle 114 is of a size and is spaced apart from the exterior surface 112G of the container 112 such as to provide sufficient grasping room such that an average adult can completely insert all the fingers of one hand (not shown) between the handle 114 and the exterior surface 112G of the container 112.

A reflective layer 116 is mounted on the interior surface 112F of the container 112. The reflective layer 116 completely covers the bottom wall 112A of the container 112 and extends upward along the sidewall 112C of the container 112, to the first inner shoulder 112K and the second inner shoulder 112L. A transparent layer 118 is mounted on the reflective layer 116 on a side opposite the container 112. The transparent layer 118 is of a thickness such as to allow light from the flash circuit 122 (to be described hereinafter) to reflect off the reflective layer 116 onto the glow bait 22. The reflective layer 116 and the transparent layer 118 preferably have a constant thickness such as to closely approximate the shape of the interior surface 112F of the container 112. The interior surface 112F of the container 112 can be any shape such as for example, a square, an ellipsoid or a parabola provided in the shape of the interior surface 112F of the container 112 allows for energization of the glow bait 22 in response to activation of the flash circuit 122.

The inner diameter of the transparent layer 118 is of a size such that an average adult can completely insert a hand into the container 112, which allows for easy removal and insertion of the glow bait 22 into the container 112. The transparent layer 118 has a constant inner diameter along its length to prevent injury to the user or damage to the device 10 during insertion and removal of the glow bait 22. The constant diameter also allows for even reflecting of the light from the flash circuit 122 thus, allowing uniform contact of the light with the glow bait 22 which achieves even energization of the glow bait 22. The transparent layer 118 is preferably constructed of glass and has a thickness such that when the glow bait 22 is placed on the transparent layer 118, the glow bait 22 is spaced above the reflective layer 116. The spacing of the glow bait 22 above the reflective layer 116 enables the light from the flash circuit 122 to reflect off the reflective layer 116 at varying angles and to reflect off the reflective layer 116 located beneath the glow bait 22 in order to energize the portion of glow bait 22 adjacent to the transparent layer 118.

The lid 120 and the flash circuit 122 of the device 110 of the alternate embodiment are preferably identical to the lid 26 and flash circuit 32 of the preferred embodiment and therefore, will not be described. The switch 124 of the alternate embodiment is mounted similarly to the switch 44 of the preferred embodiment on the top 114A of the handle 114 of the container 112. The wires 126 (one shown) connecting the switch 124 to the circuit 122 extend through the top 114A of the handle 114 and upward through the container 112 to emerge from the container 112 adjacent the top opening 112D and extend into the lid 120 to connect with the flash circuit 122

IN USE

To use the device 10, the user grasps the handle 14 of the container 12 in a first hand (not shown) such that the fingers of the first hand extend through the handle 14. The user flips open the lid 26 of the device 10 by pulling down on the tab 28A of the hinge 28 with the thumb of the first hand. Preferably, when not in use, the lid 26 is loosely closed over the top opening 12D of the container 12. Keeping the lid 26 in the open position by holding the thumb on the tab 28A, the user then inserts the glow bait 22 into the container 12 using a second hand (not shown). In the preferred embodiment, the user places the glow bait 22 onto the concave bottom 16A of the chamber 16 in order to avoid potentially damaging the glass transparent layer 20. Next, the user closes the lid 26 over the top opening 12D of the container 12. The user then activates the flash circuit 32 by pushing the switch 44 with the thumb of the first hand while continuing to grasp the handle 14 with the same hand. The user preferably uses the second hand to assure that the lid 26 remains completely closed over the top opening 12D of the container 12 during activation. Once activation is complete, the LED 42 is extinguished and the user opens the lid 26 of the device 10 At night the LED 42 also illuminates the lid 26, thus facilitating use of the device 10. Preferably, the user opens the lid 26 as previously indicated with the thumb of the first hand on the tab 28A of the hinge 28. Holding the lid 26 open, the user then removes the glow bait 22 which is energized and ready for use in fishing, particularly at night, from the container 12 with the second hand. The degree of energization of a single glow bait 22 depends upon the number of glow bait 22 energized during a single activation of the device 10. In the preferred embodiment, a number of glow bait 22 are placed in the container 12 to cover the bottom 16A at one time in order to achieve maximum energization of the glow bait 22 on all sides. A single energization of the glow bait 22, in the container 12, in the preferred embodiment, enables the glow bait 22 to be energized and thus, glow. The embodiment of FIG. 4 operates similarly.

It is intended that the foregoing description by only illustrative of the present invention and that the present invention be limited only by the hereinafter appended claims.

We claim:

1. A device for instantaneously energizing a glow bait for use in fishing which comprises:

(a) a container means having a bottom wall and a sidewall extending upward from the bottom wall to form a top opening; the container means having an interior surface and an exterior surface;
    (b) a reflective means mounted inside the container means;
    (c) a lid means for completely covering the top opening of the container means; and
    (d) a flash means mounted inside the device to instantaneously energize the glow bait within the container means upon production of a flash of light by the flash means.

2. The device of claim 1 wherein the container means has a circular cross-section.

3. The device of claim 1 wherein a handle means is mounted onto the exterior surface of the container means for gripping the container means during use of the device.

4. The device of claim 3 wherein the lid means is pivotably mounted on the handle means to enable one handed operation of the device.

5. The device of claim 1 wherein the lid means is pivotably mounted on the exterior surface of the container means by a hinge means.

6. A device for instantaneously energizing a glow bait for use in fishing which comprises:

(a) a container means having a bottom wall and a sidewall extending upward from the bottom wall to form a top opening; the container means having an interior surface and an exterior surface;
    (b) a reflective means mounted inside the container means;
    (c) a lid means pivotably mounted adjacent to the top opening of the container means for completely covering the top opening to close the container means; and
    (d) a flash means mounted on the lid means and orientated so as to flash from the top opening of the container means into the container means when the lid means is covering the top opening to instantaneously energize the glow bait within the container means upon production of a flash of light by the flash means.

7. The device of claim 6 wherein the container means has a circular cross-section.

8. The device of claim 6 wherein a handle means is mounted onto the exterior surface of the container means for gripping the container means during use of the device.

9. The device of claim 8 wherein the lid means is pivotably mounted on the handle means to enable one handed operation of the device.

10. The device of claim 6 wherein the lid means is pivotably mounted on the exterior surface of the container means by a hinge means.

11. A device for instantaneously energizing a glow bait for use in fishing which comprises:

(a) a container means having a bottom wall and a sidewall extending upwards from the bottom wall to form a top opening, the container means having an interior surface and an exterior surface;
    (b) a reflective layer means mounted inside the container means;
    (c) a transparent layer means surrounding the reflective layer means;
    (d) a lid means pivotably mounted adjacent the top opening of the container means having a top wall and a sidewall extending downward from the top wall, the top wall having an inner surface;

(e) a flash means mounted on the inner surface of the top wall of the lid means and orientated so as to flash from the top opening of the container means into the container means when the lid means is covering the top opening upon production of a flash of light by the flash means; and (f) an activating means mounted outside of the device for activating the flash means when the lid means is covering the top opening of the container means.

12. The device of claim 11 wherein the container means has a circular cross-section.

13. The device of claim 11 wherein a handle means is mounted onto the exterior surface of the container means for gripping the container means during use of the device.

14. The device of claim 13 wherein the activating means is mounted on the handle means.

15. The device of claim 13 wherein the lid means is pivotably mounted on the handle means to enable one handed operation of the device.

16. The device of claim 11 wherein the activating means is a push down switch.

17. The device of claim 11 wherein the lid means is pivotably mounted on the exterior surface of the container means by a hinge means.

18. The device of claim 17 wherein the hinge means has a tab means for easy pivoting of the lid means to the open position.

19. The device of claim 11 wherein the flash means has an LED which extends through the top wall of the lid means to indicate availability of the flash means for flashing.

20. The device of claim 11 wherein the flash means is a flash circuit having at least a flashbulb, a capacitor and a power source electrically joined together to produce the flash of light.

21. The device of claim 11 wherein the transparent layer means is constructed of glass.

22. The device of claim 11 wherein the transparent layer has a concave surface adjacent the bottom wall of the container means.

23. A method for instantaneously energizing a glow bait which comprises:

(a) providing a container means having a bottom wall and a sidewall extending upward from the bottom wall to form a top opening; the container means having an interior surface and an exterior surface; a reflective means mounted inside the container means; a lid means for completely covering the top opening of the container means; and a flash means mounted inside the device to instantaneously energize the glow bait within the container means upon production of a flash of light by the flash means;

(b) placing the glow bait in the container means;

(c) closing the lid means over the top opening of the container means to completely close the container means;

(d) activating the flash means to energize the glow bait and;

(e) removing the glow bait from the container means.

24. The method of claim 23 wherein a transparent means is provided on the reflective means so that the glow bait is completely illuminated.

25. A method for instantaneously energizing a glow bait for use in fishing which comprises:

(a) providing a container means having a bottom wall and a sidewall extending upwards from the bottom wall to form a top opening, the container means having an interior surface and an exterior surface; a reflective layer means mounted inside the container means; a transparent layer means surrounding the reflective layer means; a lid means pivotably mounted adjacent the top opening of the container means having a top wall and a sidewall extending downward from the top wall, the top wall having an inner surface; a flash means mounted on the inner surface of the top wall of the lid means and orientated so as to flash from the top opening of the container means into the container means when the lid means is covering the top opening upon production of a flash of light by the flash means; and an activating means mounted outside of the device for activating the flash means when the lid means is covering the top opening of the container means;

(b) placing the glow bait in the container means;

(c) closing the lid means over the top opening of the container means to completely close the container means;

(d) activating the flash means for energizing the glow bait; and (e) removing the glow bait from the container means.

26. The method of claim 25 wherein the glow bait is placed on the transparent layer means above the bottom wall of the container means and wherein the light is focused at the glow bait by the reflective layer means.

27. The method of claim 25 wherein more than one glow bait is activated at the same time.

* * * * *